(12) United States Patent
Tsutsumi et al.

(10) Patent No.: US 11,110,961 B2
(45) Date of Patent: Sep. 7, 2021

(54) WASHER TANK MOUNTING STRUCTURE

(71) Applicant: TOYOTA JIDOSHA KABUSHIKI KAISHA, Aichi-ken (JP)

(72) Inventors: Naoki Tsutsumi, Nagakute (JP); Yuto Komiyama, Nisshin (JP); Ryota Tatsumi, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 55 days.

(21) Appl. No.: 16/746,958

(22) Filed: Jan. 20, 2020

(65) Prior Publication Data
US 2020/0231215 A1    Jul. 23, 2020

(30) Foreign Application Priority Data

Jan. 22, 2019    (JP) .............................. JP2019-008119

(51) Int. Cl.
| | |
|---|---|
| B62D 21/15 | (2006.01) |
| B60S 1/50 | (2006.01) |
| B60S 1/56 | (2006.01) |
| F04B 23/02 | (2006.01) |
| B60R 19/02 | (2006.01) |

(52) U.S. Cl.
CPC ............ B62D 21/152 (2013.01); B60R 19/02 (2013.01); B60S 1/50 (2013.01); B60S 1/56 (2013.01); F04B 23/025 (2013.01)

(58) Field of Classification Search
CPC ......... B62D 21/16; B62D 21/152; B60S 1/00; B60S 1/50; B60S 1/56; F04B 23/00; F04B 23/025; B60R 19/24; B60R 19/26
USPC ...................... 296/187.09; 239/130; 293/133
See application file for complete search history.

(56) References Cited

U.S. PATENT DOCUMENTS

| | | | | |
|---|---|---|---|---|
| 2007/0252412 A1* | 11/2007 | Yatsuda | ............... | B62D 25/082 296/193.09 |
| 2008/0296918 A1* | 12/2008 | Mueller | ............... | B62D 21/152 293/110 |

(Continued)

FOREIGN PATENT DOCUMENTS

| | | | | |
|---|---|---|---|---|
| EP | 0067407 A1 * | 12/1982 | ............. | B62D 21/17 |
| JP | 2004-314661 A | 11/2004 | | |

(Continued)

OTHER PUBLICATIONS

JP2011-194965A, Asaga, Washer Tank For Automobile and Front Part Structure of Vehicle, Jun. 10, 2011, Japanese Patent Office (Year: 2011).*

*Primary Examiner* — Dennis H Redder
*Assistant Examiner* — Joyce Eileen Hill
(74) *Attorney, Agent, or Firm* — Hauptman Ham, LLP (57) ABSTRACT

A washer tank mounting structure includes a washer tank including a front mounting portion and a rear mounting portion, wherein the front mounting portion is mounted on a vehicle front-side end of a crash box, the crash box being arranged between a front side member and a bumper reinforcement, the vehicle front-side end of the crash box being a front end portion of the crash box in a front-rear direction of a vehicle, and the rear mounting portion includes a first rear mounting portion mounted on a vehicle rear-side end of the crash box, the vehicle rear-side end of the crash box being a rear end portion of the crash box in the front-rear direction of the vehicle.

11 Claims, 6 Drawing Sheets

(56) References Cited

U.S. PATENT DOCUMENTS

| | | | |
|---|---|---|---|
| 2011/0089720 A1* | 4/2011 | Matsuura | B60S 1/50 296/193.09 |
| 2014/0217194 A1* | 8/2014 | Han | B60S 1/488 239/1 |
| 2018/0015908 A1* | 1/2018 | Rice | G05D 1/0088 |
| 2020/0189528 A1* | 6/2020 | Kubota | B60S 1/481 |

FOREIGN PATENT DOCUMENTS

| JP | 2011194965 A | * 10/2011 |
|---|---|---|
| JP | 5430459 B2 | 2/2014 |
| JP | 2015-77947 A | 4/2015 |

* cited by examiner

WASHER TANK MOUNTING STRUCTURE

INCORPORATION BY REFERENCE

The disclosure of Japanese Patent Application No. 2019-008119 filed on Jan. 22, 2019 including the specification, drawings and abstract is incorporated herein by reference in its entirety.

BACKGROUND

1. Technical Field

The present disclosure relates to a washer tank mounting structure.

2. Description of Related Art

Japanese Unexamined Patent Application Publication No. 2004-314661 (JP 2004-314661 A) discloses a structure in which a fitting portion of a washer tank is inserted into a bumper reinforcement and the washer tank is mounted on the bumper reinforcement by a contact pressure between the outer surface of the fitting portion and the inner surface of the bumper reinforcement.

In the washer tank mounting structure of JP 2004-314661 A, the washer tank is mounted on the bumper reinforcement by inserting, into the bumper reinforcement, the fitting portion protruding from the washer tank toward the bumper reinforcement. If the mass of the washer tank increases, the fitting portion may detach from the bumper reinforcement and the washer tank may fall off. Therefore, there is room for improvement in that the washer tank is retained stably.

SUMMARY

The present disclosure provides a washer tank mounting structure in which a washer tank can be retained more stably than related art.

A first aspect of the present disclosure relates to a washer tank mounting structure. The washer tank mounting structure includes a washer tank including a front mounting portion and a rear mounting portion. In the washer tank mounting structure, the front mounting portion is mounted on a vehicle front-side end of a crash box arranged between a front side member and a bumper reinforcement. The vehicle front-side end of the crash box is a front end portion of the crash box in a front-rear direction of a vehicle. The rear mounting portion includes a first rear mounting portion mounted on a vehicle rear-side end of the crash box. The vehicle rear-side end of the crash box is a rear end portion of the crash box in the front-rear direction of the vehicle.

According to the structure described above, the front mounting portion of the washer tank is mounted on the vehicle front-side end of the crash box, and the rear mounting portion of the washer tank includes the first rear mounting portion mounted on the vehicle rear-side end of the crash box. Therefore, the washer tank can be retained at both the ends in the front-rear direction of the vehicle in the crash box, which is a framework member of a vehicle body. Thus, even if the capacity of the washer tank is large and the mass of the washer tank is relatively large, the washer tank can be retained stably.

In the washer tank mounting structure of the aspect described above, the crash box may include a box body, a front plate provided at a vehicle front-side end of the box body, and a rear plate provided at a vehicle rear-side end of the box body. The vehicle front-side end of the box body may be a front end portion of the box body in the front-rear direction of the vehicle. The vehicle rear-side end of the box body may be a rear end portion of the box body in the front-rear direction of the vehicle. The front mounting portion may be mounted on the front plate of the crash box, and the first rear mounting portion may be mounted on the rear plate of the crash box.

According to the structure described above, the front mounting portion is mounted on the front plate of the crash box, and the first rear mounting portion is mounted on the rear plate of the crash box. Therefore, the following effects can be attained as compared to a case where at least one of the front mounting portion and the first rear mounting portion is mounted on the box body of the crash box. (i) It is possible to reduce the occurrence of a case where the washer tank affects compressive deformation when a shock load is input to the crash box. Thus, even if the washer tank is mounted on the crash box, the crash box can compressively be deformed when a predetermined load is input. (ii) It is possible to reduce difficulty in mounting the washer tank on the crash box because the washer tank hinders the mounting work when the washer tank is mounted on the crash box.

In the washer tank mounting structure of the aspect described above, the rear mounting portion may further include a second rear mounting portion mounted on an outrigger.

According to the structure described above, the rear mounting portion includes the second rear mounting portion. Therefore, not only the front mounting portion and the first rear mounting portion but also the second rear mounting portion can bear the load in response to the input to the washer tank while the vehicle is traveling. Thus, the input to the front mounting portion and the first rear mounting portion is reduced as compared to a case where the second rear mounting portion is not provided. Accordingly, the washer tank can be retained more stably. Further, the second rear mounting portion is mounted on the outrigger. Therefore, even if the crash box is compressively deformed, the second rear mounting portion is kept mounted on the outrigger. Thus, it is possible to reduce the occurrence of a case where the washer tank falls off.

In the washer tank mounting structure of the aspect described above, the front mounting portion and the first rear mounting portion may be provided at different positions in a vertical direction. The second rear mounting portion may be located on an outer position in a vehicle width direction with respect to the front mounting portion and the first rear mounting portion.

According to the structure described above, the front mounting portion and the first rear mounting portion are provided at different positions in the vertical direction, and the second rear mounting portion is located on the outer position in the vehicle width direction with respect to the front mounting portion and the first rear mounting portion. Therefore, it is possible to form a triangle having vertices at three mounting portions that are the front mounting portion, the first rear mounting portion, and the second rear mounting portion when viewed in a direction from a front of the washer tank or in a direction from a rear of the washer tank. Thus, it is possible to reduce the occurrence of a case where the washer tank moves in the front-rear direction of the vehicle (vertical direction) or the vehicle width direction in response to the input while the vehicle is traveling. Accordingly, the washer tank can be retained more stably.

In the washer tank mounting structure of the aspect described above, the front mounting portion and the first rear mounting portion may be located on an inner position in the vehicle width direction with respect to a center of the washer tank in the vehicle width direction. The second rear mounting portion may be located on an outer position in the vehicle width direction with respect to the center of the washer tank in the vehicle width direction.

According to the structure described above, the front mounting portion and the first rear mounting portion are located on the inner position in the vehicle width direction with respect to the center of the washer tank in the vehicle width direction, and the second rear mounting portion is located on the outer position in the vehicle width direction with respect to the center of the washer tank in the vehicle width direction. Therefore, the area of the triangle having vertices at the three mounting portions that are the front mounting portion, the first rear mounting portion, and the second rear mounting portion when viewed in the direction from the front of the washer tank or in the direction from the rear of the washer tank can be increased as compared to a case where the second rear mounting portion is located on the inner position in the vehicle width direction with respect to the center of the washer tank in the vehicle width direction similarly to the front mounting portion and the first rear mounting portion. Thus, the washer tank can be retained more stably.

In the washer tank mounting structure of the aspect described above, the rear mounting portion may further include a third rear mounting portion, which is a boss disposed in a hole formed in the crash box.

According to the structure described above, the rear mounting portion includes the third rear mounting portion. Therefore, not only the three mounting portions that are the front mounting portion, the first rear mounting portion, and the second rear mounting portion but also the third rear mounting portion can bear the load in response to the input to the washer tank while the vehicle is traveling. Thus, the input to the three mounting portions that are the front mounting portion, the first rear mounting portion, and the second rear mounting portion is reduced as compared to a case where the third rear mounting portion is not provided. Accordingly, the washer tank can be retained more stably.

Also, according to the structure described above, the third rear mounting portion is the boss disposed in the hole formed in the crash box. Therefore, the number of components and the number of mounting steps can be reduced as compared to a case where the third rear mounting portion has a fastening structure using a bolt and a nut.

Also, according to the structure described above, since the third rear mounting portion is the boss disposed in the hole formed in the crash box, it is possible to eliminate a working space for mounting the third rear mounting portion on the crash box. Thus, there is no need to provide a recess or the like in the washer tank in order to secure the working space. Accordingly, the capacity of the washer tank can be increased as compared to a case where the recess or the like is required.

In the washer tank mounting structure of the aspect described above, the third rear mounting portion may be located on an outer position in the vehicle width direction with respect to the first rear mounting portion and on an inner position in the vehicle width direction with respect to the second rear mounting portion.

According to the structure described above, the third rear mounting portion is located on the outer position in the vehicle width direction with respect to the first rear mounting portion and on the inner position in the vehicle width direction with respect to the second rear mounting portion. Therefore, the third rear mounting portion can efficiently reduce the amounts of the load to be borne by the first and second rear mounting portions in response to the input to the washer tank while the vehicle is traveling.

In the washer tank mounting structure of the aspect described above, the third rear mounting portion may be located outside a triangle having vertices at three mounting portions that are the front mounting portion, the first rear mounting portion, and the second rear mounting portion when viewed in a direction from a front of the washer tank or in a direction from a rear of the washer tank.

According to the structure described above, the third rear mounting portion is located outside the triangle having vertices at the three mounting portions that are the front mounting portion, the first rear mounting portion, and the second rear mounting portion when viewed in the direction from the front of the washer tank or in the direction from the rear of the washer tank. Therefore, the area of a quadrangle obtained by adding the third rear mounting portion can be made larger than the area of the triangle having vertices at the three mounting portions that are the front mounting portion, the first rear mounting portion, and the second rear mounting portion when viewed in the direction from the front of the washer tank or in the direction from the rear of the washer tank. Thus, it is possible to effectively reduce the occurrence of the case where the washer tank moves in the front-rear direction of the vehicle (vertical direction) or the vehicle width direction in response to the input to the washer tank while the vehicle is traveling. Accordingly, the washer tank can be retained stably.

In the washer tank mounting structure of the aspect described above, a windshield pump, a headlamp cleaner pump, and a Light Detection and Ranging pump may be mounted on the washer tank.

According to the structure described above, the windshield pump, the headlamp cleaner pump, and the Light Detection and Ranging pump are mounted on the washer tank. Therefore, windshields, headlamps, and a Light Detection and Ranging sensor can be cleaned by sending a washer fluid in the washer tank to those parts.

In the washer tank mounting structure of the aspect described above, the Light Detection and Ranging pump may include a front Light Detection and Ranging pump and a rear Light Detection and Ranging pump.

According to the structure described above, the Light Detection and Ranging pump includes the front Light Detection and Ranging pump and the rear Light Detection and Ranging pump. Therefore, both a front Light Detection and Ranging sensor and a rear Light Detection and Ranging sensor can be cleaned by sending the washer fluid in the washer tank to those Light Detection and Ranging sensors.

In the washer tank mounting structure of the aspect described above, the washer tank may be composed of only one washer tank.

According to the structure described above, the washer tank is provided alone. Therefore, the number of mounting portions of the washer tank for the vehicle body, the number of replenishment paths for replenishing the washer tank with the washer fluid, and the like can be reduced as compared to a case where a plurality of washer tanks are provided. Thus, the mass of the entire vehicle can be reduced. Further, the frequency of replenishment (replacement) of the washer fluid can be reduced. Thus, merchantability can be improved.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A washer tank mounting structure according to an embodiment is described below with reference to the drawings. In the drawings, FR represents a front side (front side of a vehicle), UP represents an upper side (upper side of the vehicle), and OUT represents an outer side in a vehicle width direction.

A washer tank mounting structure (hereinafter referred to simply as mounting structure as well) 10 according to the embodiment is a structure for mounting, on a vehicle body 30, a washer tank 20 that stores a washer fluid (cleaning fluid) inside.

Figure 1:
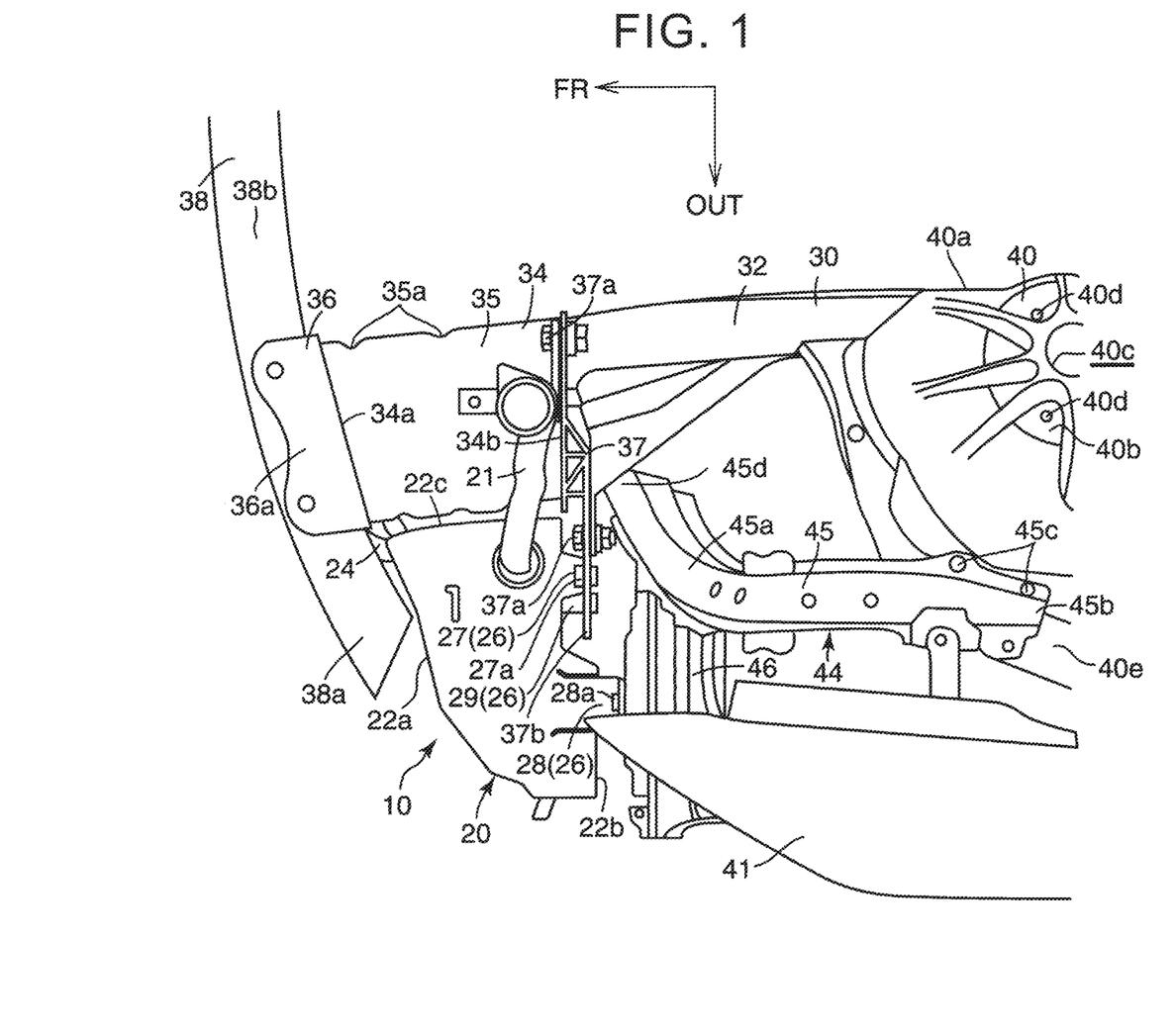
FIG. 1 is a plan view of a washer tank mounting structure and its vicinity according to an embodiment.

As illustrated in FIG. 1, the vehicle body 30 includes front side members 32, crash boxes 34, a bumper reinforcement 38, suspension towers 40, fenders 41, and outriggers 44.

The front side members 32 are provided on both right and left sides of the vehicle to extend in a front-rear direction of the vehicle. The front side member 32 is a framework member of the vehicle whose sectional shape orthogonal to the extending direction (transverse sectional shape) is a closed sectional shape such as a rectangular shape.

The crash box 34 is a framework member of the vehicle. The crash box 34 is provided in order to absorb energy in the event of frontal collision of the vehicle by being compressively deformed in the front-rear direction of the vehicle, which is an axial direction. The crash box 34 is arranged between the front side member 32 and the bumper reinforcement 38. The crash box 34 includes a box body 35, a front plate 36, and a rear plate 37. The front plate 36 is provided at a vehicle front-side end of the box body 35. The rear plate 37 is provided at a vehicle rear-side end of the box body 35.

The box body 35 extends in the front-rear direction of the vehicle as the axial direction, and has a structure in which the sectional shape orthogonal to the extending direction (transverse sectional shape) is a closed sectional shape. The transverse sectional shape of the box body 35 may be a rectangular shape or a polygonal shape such as an octagonal shape. The box body 35 has a plurality of recessed beads 35a in order to facilitate axial compressive deformation in the front-rear direction of the vehicle. The recessed beads 35a are formed with a distance in the front-rear direction of the vehicle.

The front plate 36 may be formed of a single component or a plurality of components. The rigidity of the front plate 36 may be increased with a three-dimensional structure such as a honeycomb structure similarly to the rear plate 37.

The front plate 36 is fixed to the vehicle front-side end of the box body 35 by welding or the like. The front plate 36 is shaped larger than the box body 35 when viewed in an axial direction of the box body 35 (front-rear direction of the vehicle). Thus, the front plate 36 can cover the box body 35 from the front side of the vehicle. The front plate 36 is fixed to the bumper reinforcement 38 directly or via a different member (not illustrated). The front plate 36 and the bumper reinforcement 38 may be fixed together by welding or by fastening with bolts (not illustrated).

Figure 2:
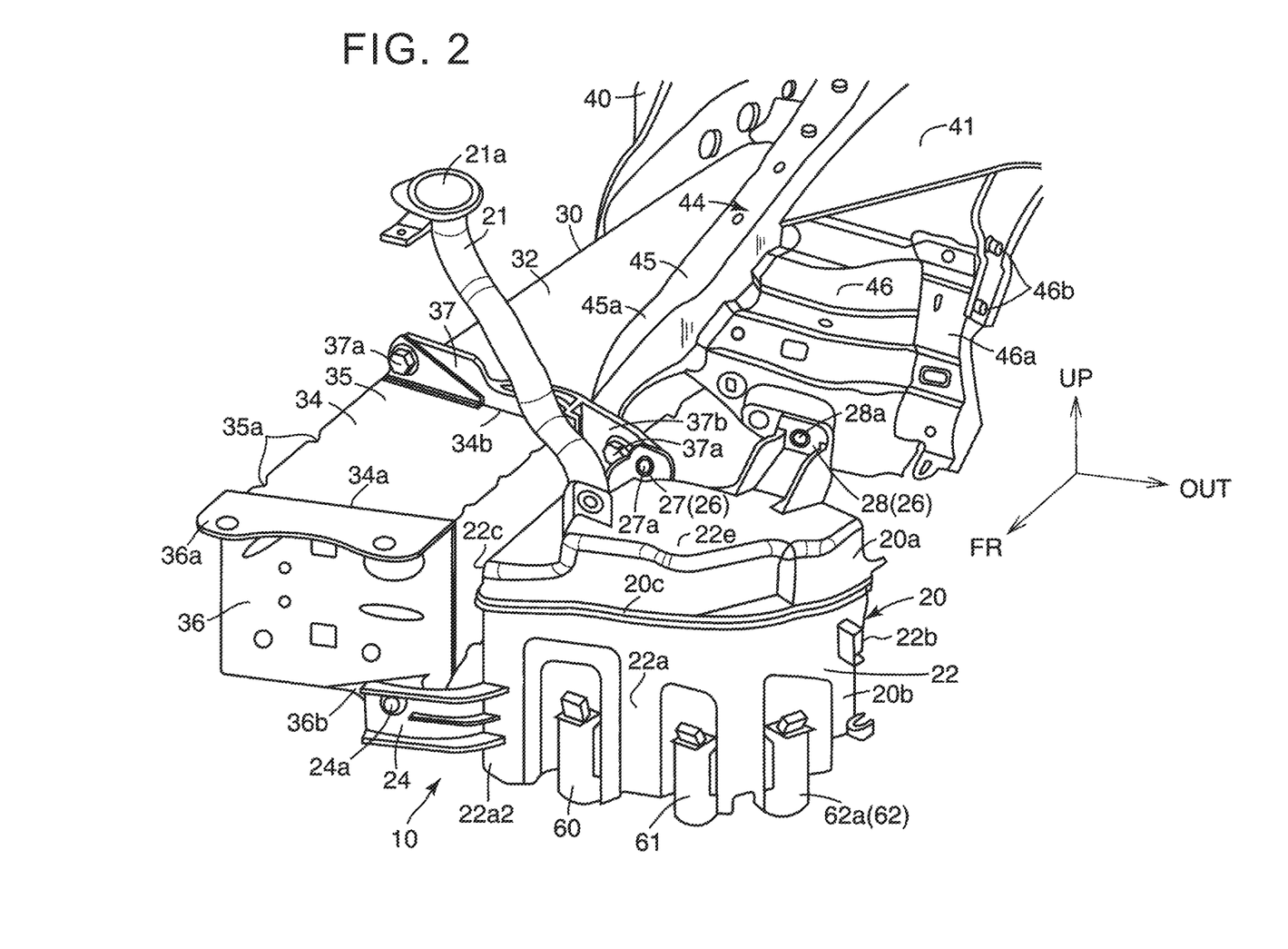
FIG. 2 is a perspective view of the washer tank mounting structure and its vicinity according to the embodiment, which are viewed from an upper side and an outer side in a vehicle width direction on a front side of a vehicle when a bumper reinforcement is omitted.

The front plate 36 has a forward extending portion 36a that extends from the upper end to the front side of the vehicle. The forward extending portion 36a is placed on an upper wall 38b of the bumper reinforcement 38, and is fixed to the upper wall 38b of the bumper reinforcement 38. As illustrated in FIG. 2, the front plate 36 has a downward extending portion 36b that extends downward from the lower end and the outer end in the vehicle width direction.

The rear plate 37 may be formed of a single component or a plurality of components. The rigidity of the rear plate 37 may be increased with a three-dimensional structure such as a honeycomb structure as illustrated in FIG. 1.

The rear plate 37 is fixed to the vehicle rear-side end of the box body 35 by welding or the like. The rear plate 37 is shaped larger than the box body 35 when viewed in the axial direction of the box body 35 (front-rear direction of the vehicle). Thus, the rear plate 37 can cover the box body 35 from the rear side of the vehicle. The rear plate 37 is fixed to the front side member 32 directly or via a different member (not illustrated). The rear plate 37 and the front side member 32 may be fixed together by welding or by fastening with bolts 37a.

The rear plate 37 has an outward extending portion 37b that extends outward in the vehicle width direction with respect to the front side member 32. The outward extending portion 37b extends to a part of the washer tank 20 on the rear side of the vehicle.

The bumper reinforcement 38 extends in the vehicle width direction. An end 38a of the bumper reinforcement 38 in the vehicle width direction extends while being inclined or curved to the outer side in the vehicle width direction and the rear side of the vehicle, and is located on the rear side of the vehicle with respect to the center of the bumper reinforcement 38 in the vehicle width direction.

For example, the sectional shape of the bumper reinforcement 38 that is orthogonal to the extending direction (transverse sectional shape) is a rectangular shape (square shape). The transverse sectional shape of the bumper reinforcement 38 may be a rectangular shape with one horizontal bar inside, a rectangular shape with two horizontal bars inside, a hat shape that is open on the front or rear side of the vehicle, or an angular C-shape that is open on the front or rear side of the vehicle.

The suspension tower 40 is connected to the middle of the front side member 32 in the extending direction at a lower end 40a, and extends upward from the front side member 32. The suspension tower 40 has a through hole 40c formed at the center of a top portion 40b. A plurality of bolt holes 40d are formed in a circumferential direction around the through hole 40c. A plurality of bolts (not illustrated) provided for a suspension (not illustrated) are inserted into the bolt holes 40d.

The fender (may be referred to as front fender) 41 is arranged on the outer side in the vehicle width direction with respect to the suspension tower 40. The fender 41 is fixed to an outer portion 40e of the suspension tower 40, which is located on the outer side in the vehicle width direction with respect to the top portion 40b.

The outrigger 44 may be formed of a single component or a plurality of components. The outrigger 44 has a front-rear extending portion 45 and a plate portion 46. The front-rear extending portion 45 extends downward and to the front side of the vehicle. The plate portion 46 extends from the front-rear extending portion 45 to the outer side in the vehicle width direction.

A part of the front-rear extending portion 45 that is located in a range from the middle in the extending direction to the front side of the vehicle is a curved portion 45a extending downward and to the front side of the vehicle while being curved inward in the vehicle width direction. The front-rear extending portion 45 is fixed to the suspension tower 40 at a vehicle rear-side end 45b by using bolts 45c or the like. Further, the front-rear extending portion 45 is fixed to the front side member 32 at a vehicle front-side end 45d by using bolts 45e or the like (see FIG. 3).

As illustrated in FIG. 2, the plate portion 46 extends outward in the vehicle width direction from the curved portion 45a of the front-rear extending portion 45. An outer end 46a of the plate portion 46 in the vehicle width direction is fixed to the fender 41 by using bolts 46b or the like.

The washer tank 20 is arranged in a space located on the outer side in the vehicle width direction with respect to the crash box 34, the rear side of the vehicle with respect to the bumper reinforcement 38, and the front side of the vehicle with respect to a front fender liner (not illustrated).

The washer tank 20 is made of a resin. The washer tank 20 is provided on the vehicle alone. The washer tank 20 has an upper tank portion 20a and a lower tank portion 20b formed separately from each other. The washer tank 20 is formed by welding the upper tank portion 20a and the lower tank portion 20b by vibration welding.

The upper tank portion 20a is provided with a replenishment hose 21 for replenishing the washer tank 20 with the washer fluid (cleaning fluid). The replenishment hose 21 extends upward and inward in the vehicle width direction with at least one bent or curved portion. The upper end of the replenishment hose 21 is fixed to a vehicle front-side end of an upper side of a radiator support (not illustrated) or its vicinity. The upper end of the replenishment hose 21 is provided with a cap 21a for opening or closing the opening of the upper end of the replenishment hose 21.

The washer tank 20 includes a tank body 22, a front mounting portion 24, and a rear mounting portion 26.

The tank body 22 can store the washer fluid (cleaning fluid) inside. A joining portion 20c between the upper tank portion 20a and the lower tank portion 20b is located at the middle of the tank body 22 in a vertical direction. The tank body 22 has a vehicle front-side surface 22a, a vehicle rear-side surface 22b, and an inner surface 22c in the vehicle width direction.

Figure 6:
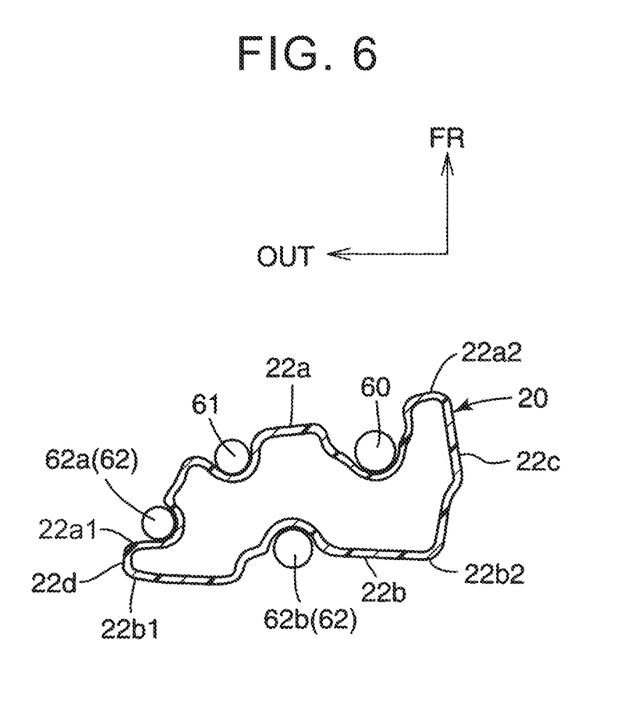
FIG. 6 is a sectional view taken along a line VI-VI in FIG. 4.

As illustrated in FIG. 6, the vehicle front-side surface 22a is inclined or curved to the outer side in the vehicle width direction and the rear side of the vehicle. The vehicle rear-side surface 22b extends in a direction substantially orthogonal to the front-rear direction of the vehicle. An outer end 22b1 of the vehicle rear-side surface 22b in the vehicle width direction is connected to an outer end 22a1 of the vehicle front-side surface 22a in the vehicle width direction directly or via a curved portion 22d.

The inner surface 22c in the vehicle width direction extends in a direction substantially orthogonal to the vehicle width direction. The inner surface 22c in the vehicle width direction connects an inner end 22a2 of the vehicle front-side surface 22a in the vehicle width direction and an inner end 22b2 of the vehicle rear-side surface 22b in the vehicle width direction.

As illustrated in FIG. 2, the front mounting portion 24 is provided alone. The front mounting portion 24 is formed integrally with the lower tank portion 20b out of the upper tank portion 20a and the lower tank portion 20b. The front mounting portion 24 is provided below the center of the tank body 22 in the vertical direction and above the lower end of the tank body 22. The front mounting portion 24 extends to the front side of the vehicle from the inner end 22a2 of the vehicle front-side surface 22a in the vehicle width direction in the tank body 22 and/or a vehicle front-side end of the inner surface 22c in the vehicle width direction in the tank body 22. Then, the front mounting portion 24 is bent inward in the vehicle width direction, and extends by a predetermined amount. The front mounting portion 24 substantially has an "L" shape in plan view. The front mounting portion 24 is located below the bumper reinforcement 38 to suppress interference with the bumper reinforcement 38.

The front mounting portion 24 is fixed to a vehicle front-side end 34a of the crash box 34. Specifically, the front mounting portion 24 is fixed to the downward extending portion 36b of the front plate 36 of the crash box 34. The front mounting portion 24 extends to the front side of the vehicle around the downward extending portion 36b, and is fastened to the downward extending portion 36b from the front side of the vehicle by using a bolt 24a.

The rear mounting portion 26 includes a first rear mounting portion 27, a second rear mounting portion 28, and a third rear mounting portion 29.

The first rear mounting portion 27 is formed integrally with the upper tank portion 20a out of the upper tank portion 20a and the lower tank portion 20b. The first rear mounting portion 27 is provided at the upper end of the tank body 22 or in its vicinity. The first rear mounting portion 27 extends upward from the upper end of the vehicle rear-side surface 22b of the tank body 22 and/or a vehicle rear-side end of an upper surface 22e of the tank body 22.

The first rear mounting portion 27 is fixed to a vehicle rear-side end 34b of the crash box 34. Specifically, the first rear mounting portion 27 is fixed to the outward extending portion 37b of the rear plate 37 of the crash box 34. The first rear mounting portion 27 is fastened to the outward extending portion 37b of the rear plate 37 from the front side of the vehicle by using a bolt 27a.

The second rear mounting portion 28 is formed integrally with the upper tank portion 20a out of the upper tank portion 20a and the lower tank portion 20b. The second rear mounting portion 28 is provided at the upper end of the tank body 22 or in its vicinity. The second rear mounting portion 28 extends upward and to the rear side of the vehicle from the upper end of the vehicle rear-side surface 22b of the tank body 22 and/or the vehicle rear-side end of the upper surface 22e of the tank body 22. The extending amount of the second rear mounting portion 28 from the tank body 22 is larger than the extending amount of the first rear mounting portion 27 from the tank body 22.

The second rear mounting portion 28 is fixed to the outrigger 44. Specifically, the second rear mounting portion 28 is fastened to the middle of the plate portion 46 in the vehicle width direction in the outrigger 44 and the lower end of the plate portion 46 from the front side of the vehicle by using a bolt 28a.

Figure 4:
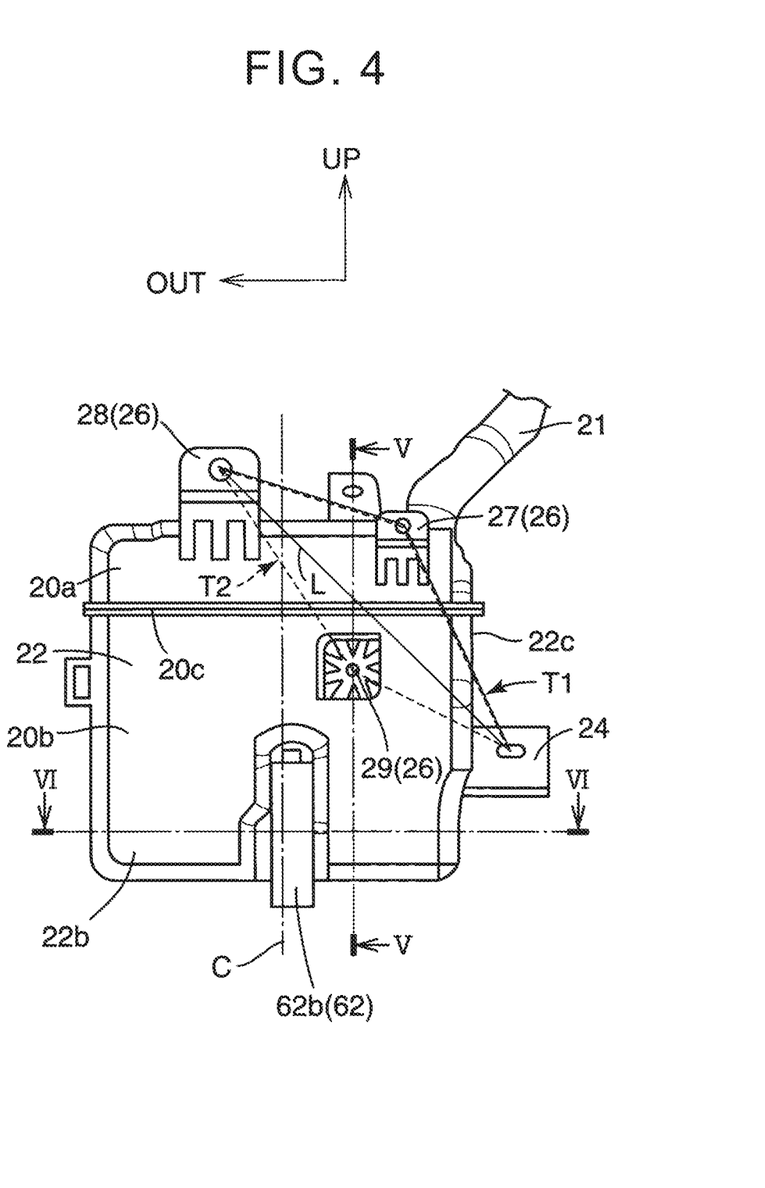
FIG. 4 is a rear view of a washer tank according to the embodiment.

As illustrated in FIG. 4, the front mounting portion 24, the first rear mounting portion 27, and the second rear mounting portion 28 have the following positional relationships. The front mounting portion 24 and the first rear mounting portion 27 are located on an inner side in the vehicle width direction with respect to a center C of the tank body 22 in the vehicle width direction in the washer tank 20. The front mounting portion 24 and the first rear mounting portion 27 are provided at different positions in the vertical direction. The first rear mounting portion 27 is located on the upper side and the outer side in the vehicle width direction with respect to the front mounting portion 24. The second rear mounting portion 28 is located on the outer side in the vehicle width direction with respect to the front mounting portion 24 and the first rear mounting portion 27 and on the outer side in the vehicle width direction with respect to the center C of the washer tank 20 in the vehicle width direction. The second rear mounting portion 28 is located above the front mounting portion 24 and the first rear mounting portion 27. Thus, the three mounting portions 24, 27, and 28 form a triangle T1 having vertices at the three mounting portions 24, 27, and 28 when viewed in a direction from the front of the washer tank 20 (front side of the vehicle) or in a direction from the rear of the washer tank 20 (rear side of the vehicle).

Figure 5:
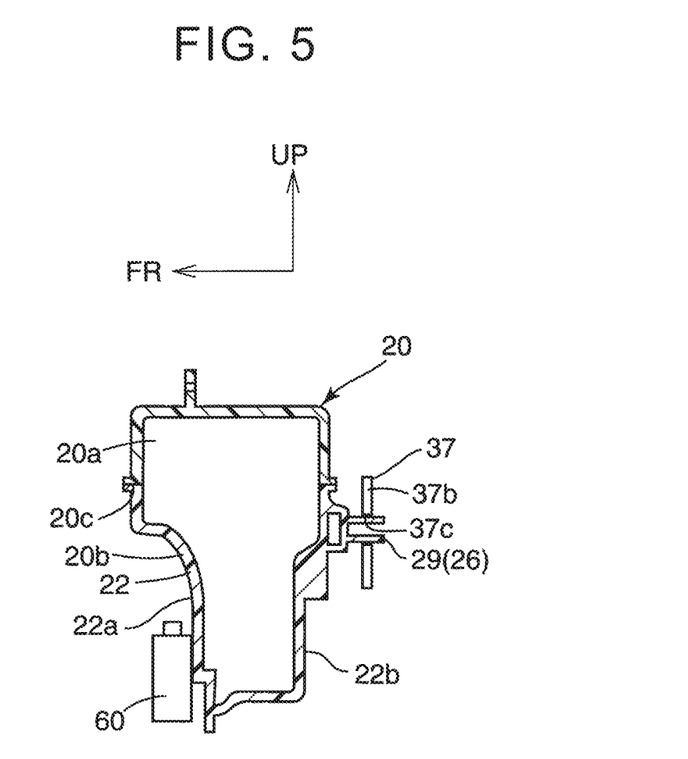
FIG. 5 is a sectional view taken along a line V-V in FIG. 4.

The third rear mounting portion 29 is formed integrally with the lower tank portion 20b out of the upper tank portion 20a and the lower tank portion 20b. The third rear mounting portion 29 is provided at the center of the tank body 22 in the vertical direction or in its vicinity. As illustrated in FIG. 5, the third rear mounting portion 29 is a boss extending to the rear side of the vehicle from the vehicle rear-side surface 22b of the tank body 22. The third rear mounting portion 29 is inserted from the front side of the vehicle into a hole 37c formed in the outward extending portion 37b of the rear plate 37 of the crash box 34. The third rear mounting portion 29 is only inserted into the hole 37c from the front side of the vehicle, and is not fastened to the rear plate 37 of the crash box 34 by using a bolt.

As illustrated in FIG. 4, the third rear mounting portion 29 is located on the inner side in the vehicle width direction with respect to the center C of the washer tank 20 in the vehicle width direction. The third rear mounting portion 29 is located on the outer side in the vehicle width direction with respect to the first rear mounting portion 27 and on the inner side in the vehicle width direction with respect to the second rear mounting portion 28. The third rear mounting portion 29 is located outside the triangle T1 having vertices at the three mounting portions that are the front mounting portion 24, the first rear mounting portion 27, and the second rear mounting portion 28 when viewed in the direction from the front of the washer tank 20 (front side of the vehicle) or in the direction from the rear of the washer tank 20 (rear side of the vehicle). The third rear mounting portion 29 is located opposite to the first rear mounting portion 27 across a line L connecting the front mounting portion 24 and the second rear mounting portion 28 when viewed in the direction from the front of the washer tank 20 (front side of the vehicle) or in the direction from the rear of the washer tank 20 (rear side of the vehicle).

As illustrated in FIG. 2, a windshield pump 60, a headlamp cleaner pump 61, and Light Detection and Ranging (LiDAR) pumps 62 are mounted on the single washer tank 20. The LiDAR pumps 62 include a front LiDAR pump 62a and a rear LiDAR pump 62b (see FIG. 3).

The windshield pump 60 is arranged at the lower end of the tank body 22 on the front side of the vehicle. The windshield pump 60 sends the washer fluid to a washer (not illustrated) configured to jet the washer fluid to a front windshield and/or a rear windshield (not illustrated) of the vehicle.

The headlamp cleaner pump 61 is arranged at the lower end of the tank body 22 on the front side of the vehicle, and is located on the outer side in the vehicle width direction with respect to the windshield pump 60. The headlamp cleaner pump 61 sends the washer fluid to a washer (not illustrated) configured to jet the washer fluid to headlamps (not illustrated). The washer configured to jet the washer fluid to the headlamps is arranged on the front side of the vehicle with respect to the washer tank 20. In order to shorten a path from the headlamp cleaner pump 61 to the washer, the headlamp cleaner pump 61 is arranged on the tank body 22 on the front side of the vehicle.

The LiDAR pumps 62 send the washer fluid to washers (not illustrated) configured to jet the washer fluid to LiDAR sensors (not illustrated). The front LiDAR pump 62a is arranged at the lower end of the tank body 22 on the front side of the vehicle, and is located on the outer side in the vehicle width direction with respect to the headlamp cleaner pump 61. The front LiDAR pump 62a sends the washer fluid to a washer (not illustrated) configured to jet the washer fluid to a front LiDAR sensor (not illustrated) configured to mainly detect an area ahead of the vehicle. The washer configured to jet the washer fluid to the front LiDAR sensor is arranged on the front side of the vehicle with respect to the washer tank 20. In order to shorten a path from the front LiDAR pump 62a to the washer, the front LiDAR pump 62a is arranged on the tank body 22 on the front side of the vehicle.

Figure 3:
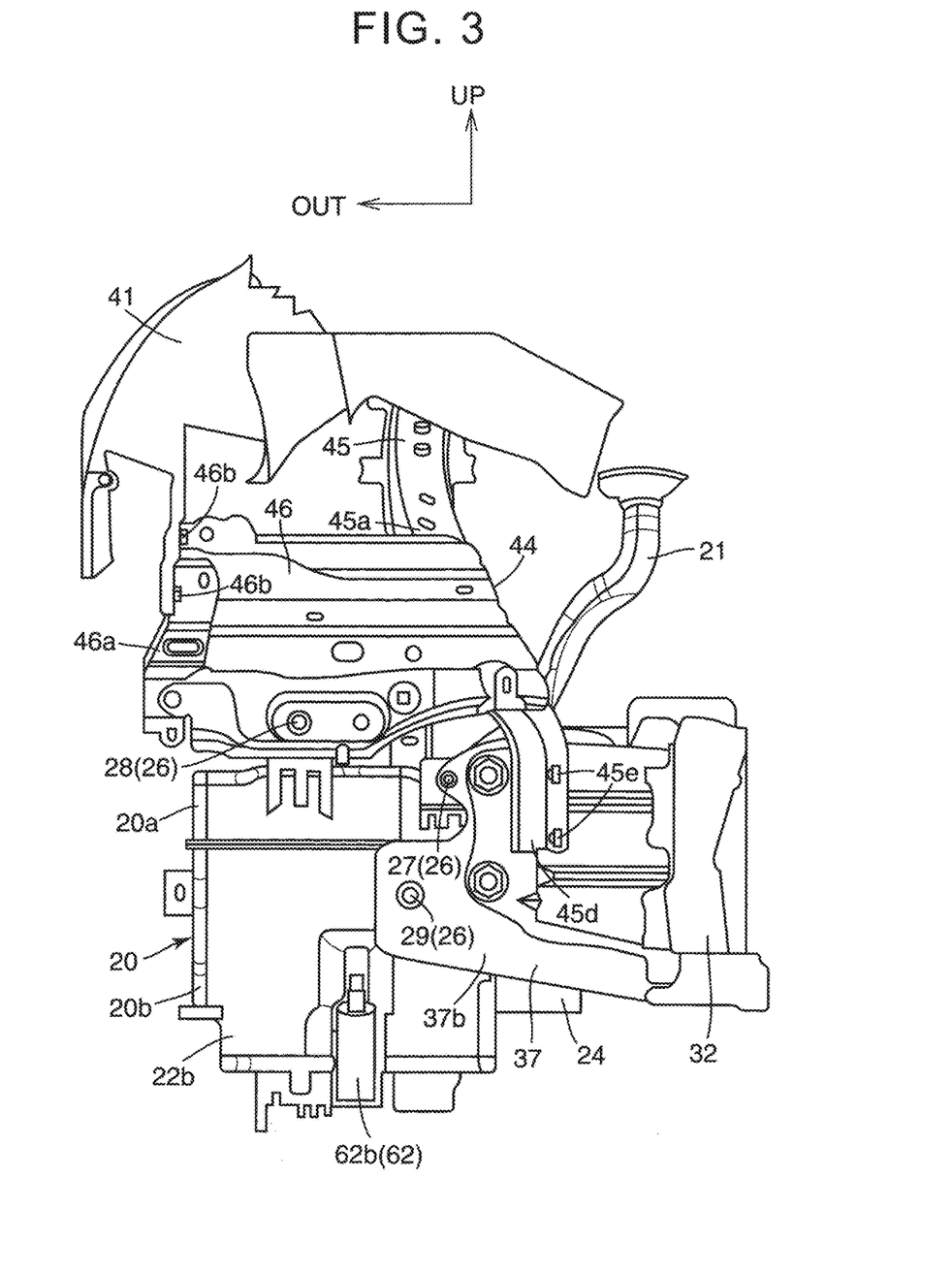
FIG. 3 is a rear view of the washer tank mounting structure and its vicinity according to the embodiment.

As illustrated in FIG. 3, the rear LiDAR pump 62b is arranged at the lower end of the tank body 22 on the rear side of the vehicle. The rear LiDAR pump 62b sends the washer fluid to a washer (not illustrated) configured to jet the washer fluid to a rear LiDAR sensor (not illustrated) configured to mainly detect an area behind the vehicle. If a rear camera configured to photograph an area behind the vehicle is mounted on the rear of the vehicle, the rear LiDAR pump 62b may also send the washer fluid to a washer (not illustrated) configured to jet the washer fluid to the rear camera. The washer configured to jet the washer fluid to the rear LiDAR sensor is arranged on the rear side of the vehicle with respect to the washer tank 20. In order to shorten a path from the rear LiDAR pump 62b to the washer, the rear LiDAR pump 62b is arranged on the tank body 22 on the rear side of the vehicle.

The windshield pump 60, the headlamp cleaner pump 61, and the LiDAR pumps 62 (front LiDAR pump 62a and rear LiDAR pump 62b) may have the same size or different sizes. In the pumps 60, 61, and 62, the heights of inlets of the washer fluid from the washer tank 20 are set equal to each other. This setting is made in order that the timings when the washer fluid lacks (is not ejected) are synchronized among all the functions.

A level switch (not illustrated) is attached to the washer tank 20. The level switch is used for issuing an alert when the amount of washer fluid decreases. The level switch can detect the timing when the washer fluid lacks. The level switch is a mechanism using a magnet, and is affected by magnetic fields from the pumps 60, 61, and 62. Thus, the level switch is arranged away from the pumps 60, 61, and 62 by about 60 mm or more.

Next, actions and effects of the embodiment are described.

(A) The front mounting portion 24 of the washer tank 20 is mounted on the vehicle front-side end 34a of the crash box 34, and the rear mounting portion 26 of the washer tank 20 includes the first rear mounting portion 27 mounted on the vehicle rear-side end 34b of the crash box 34. Therefore, the washer tank 20 can be retained at both the ends 34a and 34b in the front-rear direction of the vehicle in the crash box 34, which is the framework member of the vehicle body. Thus, even if the capacity of the washer tank 20 is large and the mass of the washer tank 20 is relatively large, the washer tank 20 can be retained stably.

(B) The front mounting portion 24 is mounted on the front plate 36 of the crash box 34, and the first rear mounting portion 27 is mounted on the rear plate 37 of the crash box 34. Therefore, the following effects can be attained as compared to a case where at least one of the front mounting portion 24 and the first rear mounting portion 27 is mounted on the box body 35 of the crash box 34. (i) It is possible to reduce the occurrence of a case where the washer tank 20 affects compressive deformation when a shock load is input to the crash box 34. Thus, even if the washer tank 20 is mounted on the crash box 34, the crash box 34 can compressively be deformed when a predetermined load is input. (ii) It is possible to reduce the occurrence of a case where the washer tank 20 covers a mounting location when the washer tank 20 is mounted on the crash box 34. Thus, it is possible to reduce difficulty in mounting the washer tank 20 on the crash box 34 because the washer tank 20 hinders the mounting work.

(C) The rear mounting portion 26 includes the second rear mounting portion 28. Therefore, not only the front mounting portion 24 and the first rear mounting portion 27 but also the second rear mounting portion 28 can bear the load in response to the input to the washer tank 20 while the vehicle is traveling. Thus, the input to the front mounting portion 24 and the first rear mounting portion 27 is reduced as compared to a case where the second rear mounting portion 28 is not provided. Accordingly, the washer tank 20 can be retained more stably. Further, the second rear mounting portion 28 is mounted on the outrigger 44. Therefore, even if the crash box 34 is compressively deformed, the second rear mounting portion 28 is kept mounted on the outrigger 44. Thus, it is possible to reduce the occurrence of a case where the washer tank 20 falls off the vehicle body 30.

(D) The front mounting portion 24 and the first rear mounting portion 27 are provided at different positions in the vertical direction, and the second rear mounting portion 28 is located on the outer side in the vehicle width direction with respect to the front mounting portion 24 and the first rear mounting portion 27. Therefore, it is possible to form the triangle T1 having vertices at the three mounting portions that are the front mounting portion 24, the first rear mounting portion 27, and the second rear mounting portion 28 when viewed in the direction from the front of the washer tank 20 (front side of the vehicle) or in the direction from the rear of the washer tank 20 (rear side of the vehicle). Thus, it is possible to reduce the occurrence of a case where the washer tank 20 moves in the front-rear direction of the vehicle (vertical direction) or the vehicle width direction in response to the input to the washer tank 20 while the vehicle is traveling. Accordingly, the washer tank 20 can be retained more stably.

(E) The front mounting portion 24 and the first rear mounting portion 27 are located on the inner side in the vehicle width direction with respect to the center C of the washer tank 20 in the vehicle width direction, and the second rear mounting portion 28 is located on the outer side in the vehicle width direction with respect to the center C of the washer tank 20 in the vehicle width direction. Therefore, the area of the triangle T1 can be increased as compared to a case where the second rear mounting portion 28 is located on the inner side in the vehicle width direction with respect to the center C of the washer tank 20 in the vehicle width direction similarly to the front mounting portion 24 and the first rear mounting portion 27. Thus, the washer tank 20 can be retained more stably.

(F) The rear mounting portion 26 includes the third rear mounting portion 29. Therefore, not only the three mounting portions that are the front mounting portion 24, the first rear mounting portion 27, and the second rear mounting portion 28 but also the third rear mounting portion 29 can bear the load in response to the input to the washer tank 20 while the vehicle is traveling. Thus, the input to the three mounting portions that are the front mounting portion 24, the first rear mounting portion 27, and the second rear mounting portion 28 is reduced as compared to a case where the third rear mounting portion 29 is not provided. Accordingly, the washer tank 20 can be retained more stably.

(G) The third rear mounting portion 29 is the boss inserted into the hole 37c formed in the rear plate 37 of the crash box 34. Therefore, the number of components and the number of mounting steps can be reduced as compared to a case where the third rear mounting portion 29 has a fastening structure using a bolt and a nut.

(H) Since the third rear mounting portion 29 is the boss inserted into the hole 37c formed in the rear plate 37 of the crash box 34, it is possible to eliminate a working space for mounting the third rear mounting portion 29 on the rear plate 37. Thus, there is no need to provide a recess or the like in the washer tank 20 in order to secure the working space. Accordingly, the capacity of the washer tank 20 can be increased as compared to a case where the recess or the like is required.

(I) The third rear mounting portion 29 is located on the outer side in the vehicle width direction with respect to the first rear mounting portion 27 and on the inner side in the vehicle width direction with respect to the second rear mounting portion 28. Therefore, the third rear mounting portion 29 can efficiently reduce the amounts of the load to be borne by the first and second rear mounting portions 27 and 28 in response to the input to the washer tank 20 while the vehicle is traveling.

(J) The third rear mounting portion 29 is located outside the triangle T1 having vertices at the three mounting portions that are the front mounting portion 24, the first rear mounting portion 27, and the second rear mounting portion 28 when viewed in the direction from the front of the washer tank 20 or in the direction from the rear of the washer tank 20. Therefore, the area of a quadrangle T2 (see FIG. 4) obtained by adding the third rear mounting portion 29 can be made larger than the area of the triangle T1 when viewed in the direction from the front of the washer tank 20 or in the direction from the rear of the washer tank 20. Thus, it is possible to effectively reduce the occurrence of the case where the washer tank 20 moves in the front-rear direction of the vehicle (vertical direction) or the vehicle width direction in response to the input to the washer tank 20 while the vehicle is traveling. Accordingly, the washer tank 20 can be retained stably.

(K) The windshield pump 60, the headlamp cleaner pump 61, and the LiDAR pumps 62 are mounted on the washer tank 20. Therefore, the windshields, the headlamps, and the LiDAR sensors can be cleaned by sending the washer fluid in the single washer tank 20 to those parts.

(L) The LiDAR pumps 62 include the front LiDAR pump 62a and the rear LiDAR pump 62b. Therefore, both the front LiDAR sensor and the rear LiDAR sensor can be cleaned by sending the washer fluid in the single washer tank 20 to those LiDAR sensors.

(M) The washer tank 20 is provided alone. Therefore, the number of mounting portions of the washer tank 20 for the vehicle body 30, the number of replenishment paths for replenishing the washer tank 20 with the washer fluid, and the like can be reduced as compared to a case where a plurality of washer tanks 20 are provided. Thus, the mass of the entire vehicle can be reduced. Further, the frequency of replenishment (replacement) of the washer fluid can be reduced. Thus, merchantability can be improved.

(N) The washer tank 20 is arranged in the space located on the outer side in the vehicle width direction with respect to the crash box 34, the rear side of the vehicle with respect to the bumper reinforcement 38, and the front side of the vehicle with respect to the front fender liner (not illustrated). Therefore, the following effects can be attained. (i) The washer tank 20 can be arranged near the crash box 34 without hindrance of the bumper reinforcement 38 or the front fender liner. Thus, the front mounting portion 24 and the first rear mounting portion 27 can be mounted on the crash box 34 relatively easily. (ii) Even if a side LiDAR sensor configured to mainly detect an area on the side of the vehicle is mounted on the vehicle in addition to the front LiDAR sensor and the rear LiDAR sensor, the side LiDAR sensor can be arranged on the front fender liner on the rear side of the vehicle. Thus, the side LiDAR sensor can be arranged at a position suitable for detection without hindrance of the washer tank 20.

What is claimed is:

1. A washer tank mounting structure, comprising a washer tank including a front mounting portion and a rear mounting portion, wherein
the front mounting portion is mounted on a vehicle front-side end of a crash box, the crash box being arranged between a front side member and a bumper reinforcement, the vehicle front-side end of the crash box being a front end portion of the crash box in a front-rear direction of a vehicle, and
the rear mounting portion includes a first rear mounting portion mounted on a vehicle rear-side end of the crash box, the vehicle rear-side end of the crash box being a rear end portion of the crash box in the front-rear direction of the vehicle.

2. The washer tank mounting structure according to claim 1, wherein
the crash box includes:
a box body;
a front plate provided at a vehicle front-side end of the box body, the vehicle front-side end of the box body being a front end portion of the box body in the front-rear direction of the vehicle; and
a rear plate provided at a vehicle rear-side end of the box body, the vehicle rear-side end of the box body being a rear end portion of the box body in the front-rear direction of the vehicle, and
the front mounting portion is mounted on the front plate of the crash box, and the first rear mounting portion is mounted on the rear plate of the crash box.

3. The washer tank mounting structure according to claim 1, wherein the rear mounting portion further includes a second rear mounting portion mounted on an outrigger.

4. The washer tank mounting structure according to claim 3, wherein
the front mounting portion and the first rear mounting portion are provided at different positions in a vertical direction, and
the second rear mounting portion is located on an outer position in a vehicle width direction with respect to the front mounting portion and the first rear mounting portion.

5. The washer tank mounting structure according to claim 4, wherein
the front mounting portion and the first rear mounting portion are located on an inner position in the vehicle width direction with respect to a center of the washer tank in the vehicle width direction, and
the second rear mounting portion is located on an outer position in the vehicle width direction with respect to the center of the washer tank in the vehicle width direction.

6. The washer tank mounting structure according to claim 3, wherein the rear mounting portion further includes a third rear mounting portion, the third rear mounting portion being a boss disposed in a hole being in the crash box.

7. The washer tank mounting structure according to claim 6, wherein the third rear mounting portion is located on an outer position in a vehicle width direction with respect to the first rear mounting portion and on an inner position in the vehicle width direction with respect to the second rear mounting portion.

8. The washer tank mounting structure according to claim 6, wherein the third rear mounting portion is located outside a triangle having vertices at three mounting portions that are the front mounting portion, the first rear mounting portion, and the second rear mounting portion, when viewed in a direction from a front of the washer tank or in a direction from a rear of the washer tank.

9. The washer tank mounting structure according to claim 1, wherein a windshield pump, a headlamp cleaner pump, and a Light Detection and Ranging pump are mounted on the washer tank.

10. The washer tank mounting structure according to claim 9, wherein the Light Detection and Ranging pump includes a front Light Detection and Ranging pump and a rear Light Detection and Ranging pump.

11. The washer tank mounting structure according to claim 1, wherein the washer tank is composed of only one washer tank.

* * * * *